(12) United States Patent
Kuziemko (10) Patent No.: US 11,448,094 B2
(45) Date of Patent: Sep. 20, 2022

(54) SUPPORT ASSEMBLY FOR GAS TURBINE ENGINE

(71) Applicant: ROLLS-ROYCE plc, London (GB)

(72) Inventor: Wojciech Kuziemko, Derby (GB)

(73) Assignee: ROLLS-ROYCE plc, London (GB)

( * ) Notice: Subject to any disclaimer, the term of this patent is extended or adjusted under 35 U.S.C. 154(b) by 0 days.

(21) Appl. No.: 17/528,882

(22) Filed: Nov. 17, 2021

(65) Prior Publication Data

US 2022/0162964 A1    May 26, 2022

(30) Foreign Application Priority Data

Nov. 24, 2020  (GB) ...................... 2018430

(51) Int. Cl.
  *F01D 25/28*  (2006.01)
  *F01D 25/16*  (2006.01)
  *B64D 27/26*  (2006.01)

(52) U.S. Cl.
  CPC ........... *F01D 25/162* (2013.01); *B64D 27/26* (2013.01); *F01D 25/28* (2013.01); *B64D 2027/264* (2013.01); *F05D 2220/323* (2013.01); *F05D 2240/90* (2013.01)

(58) Field of Classification Search
  CPC ....... F01D 25/162; F01D 25/28; B64D 27/26; B64D 2027/264; F05D 2220/323; F05D 2240/90
  See application file for complete search history.

(56) References Cited

U.S. PATENT DOCUMENTS

| 4,214,851 | A | * | 7/1980 | Tuley | F01D 25/14 415/115 |
| 4,979,872 | A | * | 12/1990 | Myers | F01D 9/065 411/383 |
| 5,357,744 | A | * | 10/1994 | Czachor | F16B 43/025 415/134 |
| 8,992,173 | B2 | * | 3/2015 | Farah | F01D 25/28 415/201 |

(Continued)

FOREIGN PATENT DOCUMENTS

EP    3336318 B1    6/2020

OTHER PUBLICATIONS

Dec. 10, 2021 Search Report issued in British Patent Application No. 2018430.5.

(Continued)

*Primary Examiner* — David E Sosnowski
*Assistant Examiner* — Theodore C Ribadeneyra
(74) *Attorney, Agent, or Firm* — Oliff PLC (57) ABSTRACT

A support assembly for a gas turbine engine is provided. The support assembly includes an outer casing, an inner structure, a strut and a mechanical fastener. The outer casing defines a longitudinal central axis. The inner structure includes a platform and a support portion disposed around the platform. The platform defines an aperture therethrough and the support portion defines a slot therethrough adjacent to the platform. The slot at least partially surrounds the platform and extends axially towards the aperture by an axial slot length along the longitudinal central axis. The strut extends generally radially from the inner structure to the outer casing. The mechanical fastener is received through the aperture of the platform.

15 Claims, 11 Drawing Sheets

(56) References Cited

U.S. PATENT DOCUMENTS

| | | | |
|---|---|---|---|
| 9,458,721 B2* | 10/2016 | Palmer | F01D 25/162 |
| 9,869,204 B2* | 1/2018 | Winn | F01D 25/145 |
| 10,247,035 B2* | 4/2019 | Lefebvre | F16B 39/103 |
| 10,371,010 B2* | 8/2019 | Farah | F01D 25/162 |
| 10,443,449 B2* | 10/2019 | Lefebvre | F01D 25/246 |
| 2003/0210979 A1 | 11/2003 | Doerflein et al. | |
| 2013/0052006 A1* | 2/2013 | Petty | F01D 25/162 |
| | | | 29/889.22 |
| 2013/0074518 A1 | 3/2013 | Palmer | |
| 2014/0013770 A1* | 1/2014 | Farah | F01D 25/16 |
| | | | 29/888.01 |
| 2014/0205447 A1* | 7/2014 | Patat | F01D 25/125 |
| | | | 415/111 |
| 2015/0192034 A1* | 7/2015 | Bedard | F01D 25/16 |
| | | | 29/283.5 |
| 2015/0192165 A1* | 7/2015 | Bauer | B21D 39/00 |
| | | | 411/177 |
| 2015/0260057 A1* | 9/2015 | Farah | F01D 25/28 |
| | | | 60/796 |
| 2016/0017754 A1* | 1/2016 | Kumar | F01D 25/162 |
| | | | 415/213.1 |
| 2016/0153315 A1* | 6/2016 | Kapustka | F01D 25/162 |
| | | | 403/66 |
| 2016/0201516 A1* | 7/2016 | Bauer | F01D 9/065 |
| | | | 415/213.1 |
| 2016/0208647 A1* | 7/2016 | Cherolis | F01D 25/14 |
| 2016/0222827 A1* | 8/2016 | Winn | F02C 7/12 |
| 2016/0230598 A1* | 8/2016 | Cherolis | F01D 25/12 |
| 2016/0230602 A1* | 8/2016 | Broulidakis | F01D 25/162 |
| 2016/0230603 A1* | 8/2016 | Broulidakis | F01D 25/125 |
| 2016/0273384 A1* | 9/2016 | Winn | F01D 25/125 |
| 2016/0290166 A1* | 10/2016 | Max | F16B 39/101 |
| 2016/0333739 A1* | 11/2016 | Vo | F01D 5/06 |
| 2019/0162077 A1 | 5/2019 | Ghosh et al. | |
| 2020/0208538 A1 | 7/2020 | Farah et al. | |

OTHER PUBLICATIONS

Apr. 8, 2022 Extended European Search Report issued in European Patent Application No. 21207665.7.

* cited by examiner

SUPPORT ASSEMBLY FOR GAS TURBINE ENGINE

FIELD OF THE DISCLOSURE

The present disclosure relates to a support assembly, and in particular to a support assembly for a gas turbine engine.

BACKGROUND

In turbofan aircraft engines, high pressure and intermediate/low pressure turbine loads are generally transmitted to the rest of an engine core structure via a turbine bearing structure. The turbine bearing structure is usually located between the high pressure turbine and the low/intermediate pressure turbine. The turbine bearing structure transmits bearing loads and is therefore, subjected to high loads associated with pressure difference and thermal gradients driven by air and oil system architecture. Conventionally, the turbine bearing structure includes an inner structure connected to an outer casing through a number of struts. The struts are coupled to the inner structure by bolts. The current assembly of the turbine bearing structure is known to cause high bolt bending stresses, and joint heeling at the strut-inner structure coupling.

Such high bolt bending stresses and joint heeling may affect engine structure life and engine lifecycle costs. Furthermore, high stresses and joint heeling may cause the bolt bending which decreases the joint strength. Also, due to a stiff joint between the strut and the inner structure, contact stresses between the strut and the inner structure are increased. Therefore, there exists a need for a turbine bearing structure which overcomes the above mentioned structural problems.

SUMMARY

According to a first aspect there is provided a support assembly for a gas turbine engine. The support assembly includes an outer casing, an inner structure, a strut and a mechanical fastener. The outer casing defines a longitudinal central axis. The inner structure includes a platform and a support portion disposed around the platform. The platform defines an aperture therethrough and the support portion defines a slot therethrough adjacent to the platform. The slot at least partially surrounds the platform and extends axially towards the aperture by an axial slot length along the longitudinal central axis. The strut extends generally radially from the inner structure to the outer casing with respect to the longitudinal central axis. The strut is coupled to the outer casing. The mechanical fastener is received through the aperture of the platform. The mechanical fastener is at least partially received within the strut to couple the strut to the platform. The platform flexes relative to the support portion at the slot to form a flexible joint between the radial strut and the inner structure.

As described above, the slot is defined in the support portion around the platform. The slot may enable a flexible joint between the inner structure and the strut by allowing the platform to flex relative to the support portion. The formation of slot in the support portion may therefore substantially reduce bending stresses in the mechanical fastener. Also, the inclusion of slot may prevent any kind of joint heeling at the coupling between the strut and the inner structure. Therefore, the support assembly of the present disclosure may eliminate fastener bending and joint heeling.

Such a design may increase mechanical fastener life and decrease the contact stresses at the coupling of strut and the inner structure.

Furthermore, minimized fastener bending and joint heeling may increase a life of the support assembly. The slot in the support portion of the inner structure may also enable tuning of a relative stiffness between the inner structure and the strut.

In some embodiments, the slot of the support portion includes a base extending circumferentially relative to the longitudinal central axis. The slot further includes a pair of arms extending axially from the base towards the aperture of the platform. Each arm has the axial slot length along the longitudinal central axis.

In some embodiments, the base of the slot is substantially straight.

In some embodiments, each arm is at least partially straight.

In some embodiments, each arm further comprises a circular portion at an end distal to the base of the slot.

In some embodiments, the platform has an axial platform length along the longitudinal central axis. A ratio of the axial slot length to the axial platform length is from about 1:6 to about 2:3.

In some embodiments, the ratio of the axial slot length to the axial platform length is about 5:12.

In some embodiments, the axial slot length is about 25 mm.

In some embodiments, the axial platform length is about 60 mm.

In some embodiments, the platform includes a support surface that contacts the strut. The support surface is raised with respect to the support portion.

In some embodiments, the platform further includes a protrusion that extends radially inward relative to the support portion.

In some embodiments, the support assembly further includes a sleeve disposed between the bolt and the platform.

In some embodiments, the sleeve is at least partly disposed between the mechanical fastener and the platform.

In some embodiments, the inner structure further comprises a torsion box.

According to a second aspect there is provided a gas turbine for an aircraft. The gas turbine further includes a bearing and the support assembly of the first aspect. The inner structure is coupled to the bearing.

Arrangements of the present disclosure may be beneficial for a turbine of a gas turbine engine having a direct drive as well as for a turbine of a gas turbine engine having a gearbox drive.

As noted elsewhere herein, the present disclosure may relate to a gas turbine engine. Such a gas turbine engine may comprise an engine core comprising a turbine, a combustor, a compressor, and a core shaft connecting the turbine to the compressor. Such a gas turbine engine may comprise a fan (having fan blades) located upstream of the engine core.

Arrangements of the present disclosure may be particularly, although not exclusively, beneficial for fans that are driven via a gearbox. Accordingly, the gas turbine engine may comprise the gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear. The core shaft may rigidly connect the turbine and the compressor, such that the turbine and compressor rotate at the same speed (with the fan rotating at a lower speed).

The gas turbine engine as described and/or claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

The gearbox may be a reduction gearbox (in that the output to the fan is a lower rotational rate than the input from the core shaft). Any type of gearbox may be used. For example, the gearbox may be a "planetary" or "star" gearbox, as described in more detail elsewhere herein. The gearbox may have any desired reduction ratio (defined as the rotational speed of the input shaft divided by the rotational speed of the output shaft), for example greater than 2.5, for example in the range of from 3 to 4.2, or 3.2 to 3.8, for example on the order of or at least 3, 3.1, 3.2, 3.3, 3.4, 3.5, 3.6, 3.7, 3.8, 3.9, 4, 4.1 or 4.2. The gear ratio may be, for example, between any two of the values in the previous sentence. Purely by way of example, the gearbox may be a "star" gearbox having a ratio in the range of from 3.1 or 3.2 to 3.8. In some arrangements, the gear ratio may be outside these ranges.

In any gas turbine engine as described and/or claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds), for example in the range of from 0.28 to 0.32. These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 220 cm, 230 cm, 240 cm, 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm, 390 cm (around 155 inches), 400 cm, 410 cm (around 160 inches) or 420 cm (around 165 inches). The fan diameter may be in an inclusive range bounded by any two of the values in the previous sentence (i.e. the values may form upper or lower bounds), for example in the range of from 240 cm to 280 cm or 330 cm to 380 cm.

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 220 cm to 300 cm (for example 240 cm to 280 cm or 250 cm to 270 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 330 cm to 380 cm may be in the range of from 1200 rpm to 2000 rpm, for example in the range of from 1300 rpm to 1800 rpm, for example in the range of from 1400 rpm to 1800 rpm.

In use of the gas turbine engine, the fan (with associated fan blades) rotates about a rotational axis. This rotation results in the tip of the fan blade moving with a velocity $U_{tip}$. The work done by the fan blades on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.28, 0.29, 0.30, 0.31, 0.32, 0.33, 0.34, 0.35, 0.36, 0.37, 0.38, 0.39 or 0.4 (all units in this paragraph being) Jkg$^{-1}$K$^{-1}$/(ms$^{-1}$)$^2$). The fan tip loading may be in an inclusive range bounded by any two of the values in the previous sentence (i.e. the values may form upper or lower bounds), for example in the range of from 0.28 to 0.31, or 0.29 to 0.3.

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, 17, 17.5, 18, 18.5, 19, 19.5 or 20. The bypass ratio may be in an inclusive range bounded by any two of the values in the previous sentence (i.e. the values may form upper or lower bounds), for example in the range of form 12 to 16, 13 to 15, or 13 to 14. The bypass duct may be substantially annular. The bypass duct may be radially outside the engine core. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds), for example in the range of from 50 to 70.

Specific thrust of an engine may be defined as the net thrust of the engine divided by the total mass flow through the engine. At cruise conditions, the specific thrust of an engine described and/or claimed herein may be less than (or on the order of) any of the following: 110 Nkg$^{-1}$ s, 105 Nkg$^{-1}$ s, 100 Nkg$^{-1}$ s, 95 Nkg$^{-1}$ s, 90 Nkg$^{-1}$ s, 85 Nkg$^{-1}$ s or 80 Nkg$^{-1}$ s. The specific thrust may be in an inclusive range bounded by any two of the values in the previous sentence (i.e. the values may form upper or lower bounds), for example in the range of from 80 Nkg$^{-1}$ s to 100 Nkg$^{-1}$ s, or 85 Nkg$^{-1}$ s to 95 Nkg$^{-1}$ s. Such engines may be particularly efficient in comparison with conventional gas turbine engines.

A gas turbine engine as described and/or claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). Purely by way of example, a gas turbine as described and/or claimed herein may be capable of producing a maximum thrust in the range of from 330 kN to 420 kN, for example 350 kN to 400 kN. The thrust referred to above may be the maximum net thrust at standard atmospheric conditions at sea level plus 15 degrees C. (ambient pressure 101.3 kPa, temperature 30 degrees C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds), for example in the range of from 1800K to 1950K. The maximum TET may occur, for example, at a high thrust condition, for example at a maximum take-off (MTO) condition.

A fan blade and/or aerofoil portion of a fan blade described and/or claimed herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described and/or claimed herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a bladed disc or a bladed ring. Any suitable method may be used to manufacture such a bladed disc or bladed ring. For example, at least a part of the fan blades may be machined from a block and/or at least part of the fan blades may be attached to the hub/disc by welding, such as linear friction welding.

The gas turbine engines described and/or claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and/or claimed herein may have any desired number of fan blades, for example 14, 16, 18, 20, 22, 24 or 26 fan blades.

As used herein, cruise conditions have the conventional meaning and would be readily understood by the skilled person. Thus, for a given gas turbine engine for an aircraft, the skilled person would immediately recognise cruise conditions to mean the operating point of the engine at mid-cruise of a given mission (which may be referred to in the industry as the "economic mission") of an aircraft to which the gas turbine engine is designed to be attached. In this regard, mid-cruise is the point in an aircraft flight cycle at which 50% of the total fuel that is burned between top of climb and start of descent has been burned (which may be approximated by the midpoint—in terms of time and/or distance—between top of climb and start of descent. Cruise conditions thus define an operating point of, the gas turbine engine that provides a thrust that would ensure steady state operation (i.e. maintaining a constant altitude and constant Mach Number) at mid-cruise of an aircraft to which it is designed to be attached, taking into account the number of engines provided to that aircraft. For example where an engine is designed to be attached to an aircraft that has two engines of the same type, at cruise conditions the engine provides half of the total thrust that would be required for steady state operation of that aircraft at mid-cruise.

In other words, for a given gas turbine engine for an aircraft, cruise conditions are defined as the operating point of the engine that provides a specified thrust (required to provide—in combination with any other engines on the aircraft—steady state operation of the aircraft to which it is designed to be attached at a given mid-cruise Mach Number) at the mid-cruise atmospheric conditions (defined by the International Standard Atmosphere according to ISO 2533 at the mid-cruise altitude). For any given gas turbine engine for an aircraft, the mid-cruise thrust, atmospheric conditions and Mach Number are known, and thus the operating point of the engine at cruise conditions is clearly defined.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be part of the cruise condition. For some aircraft, the cruise conditions may be outside these ranges, for example below Mach 0.7 or above Mach 0.9.

Purely by way of example, the cruise conditions may correspond to standard atmospheric conditions (according to the International Standard Atmosphere, ISA) at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to an operating point of the engine that provides a known required thrust level (for example a value in the range of from 30 kN to 35 kN) at a forward Mach number of 0.8 and standard atmospheric conditions (according to the International Standard Atmosphere) at an altitude of 38000 ft (11582 m). Purely by way of further example, the cruise conditions may correspond to an operating point of the engine that provides a known required thrust level (for example a value in the range of from 50 kN to 65 kN) at a forward Mach number of 0.85 and standard atmospheric conditions (according to the International Standard Atmosphere) at an altitude of 35000 ft (10668 m).

In use, a gas turbine engine described and/or claimed herein may operate at the cruise conditions defined elsewhere herein. Such cruise conditions may be determined by the cruise conditions (for example the mid-cruise conditions) of an aircraft to which at least one (for example 2 or 4) gas turbine engine may be mounted in order to provide propulsive thrust.

According to an aspect, there is provided an aircraft comprising a gas turbine engine as described and/or claimed herein. The aircraft according to this aspect is the aircraft for which the gas turbine engine has been designed to be attached. Accordingly, the cruise conditions according to this aspect correspond to the mid-cruise of the aircraft, as defined elsewhere herein.

According to an aspect, there is provided a method of operating a gas turbine engine as described and/or claimed herein. The operation may be at the cruise conditions as defined elsewhere herein (for example in terms of the thrust, atmospheric conditions and Mach Number).

According to an aspect, there is provided a method of operating an aircraft comprising a gas turbine engine as described and/or claimed herein. The operation according to this aspect may include (or may be) operation at the mid-cruise of the aircraft, as defined elsewhere herein.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION OF THE DRAWINGS

Embodiments will now be described by way of example only, with reference to the Figures, in which.

DETAILED DESCRIPTION

Aspects and embodiments of the present disclosure will now be discussed with reference to the accompanying figures. Further aspects and embodiments will be apparent to those skilled in the art.

Figure 1:
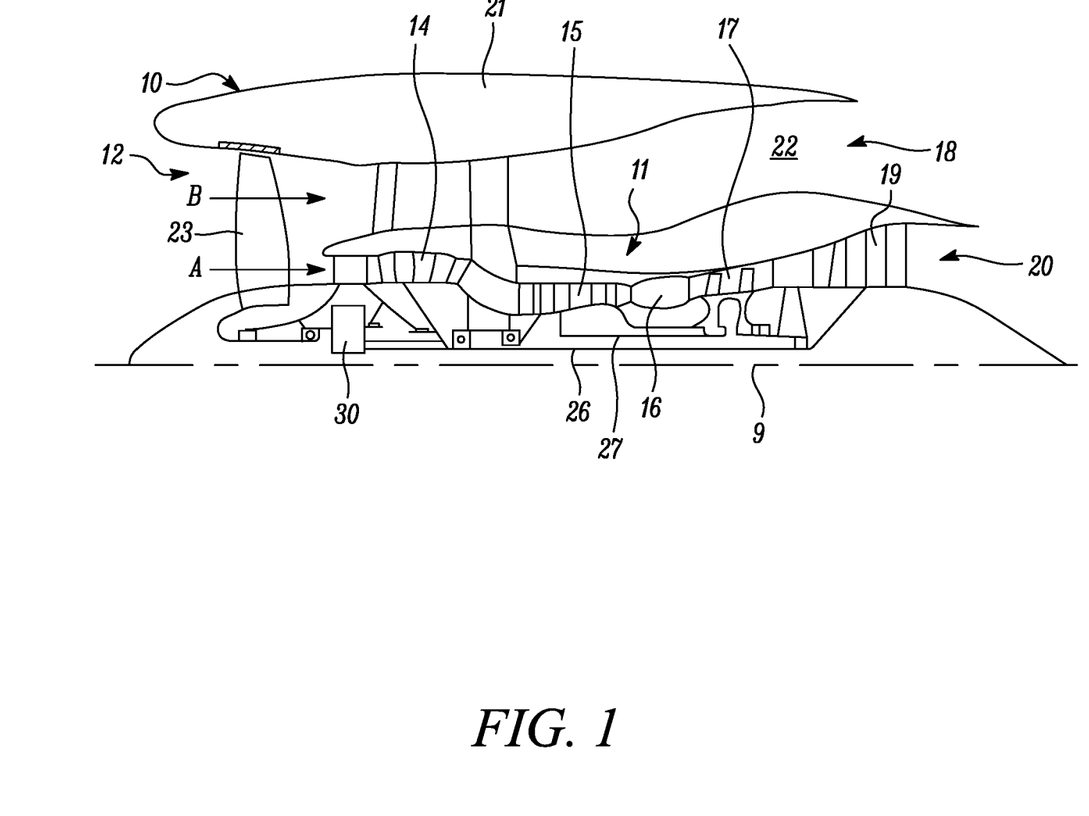
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high pressure compressor 15, combustor 16, a high pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustor 16 where it is mixed with fuel and the mixture is combusted. The resultant hot combustion products then expand through, and thereby drive, the high pressure and low pressure turbines 17, 19 before being exhausted through the core exhaust nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
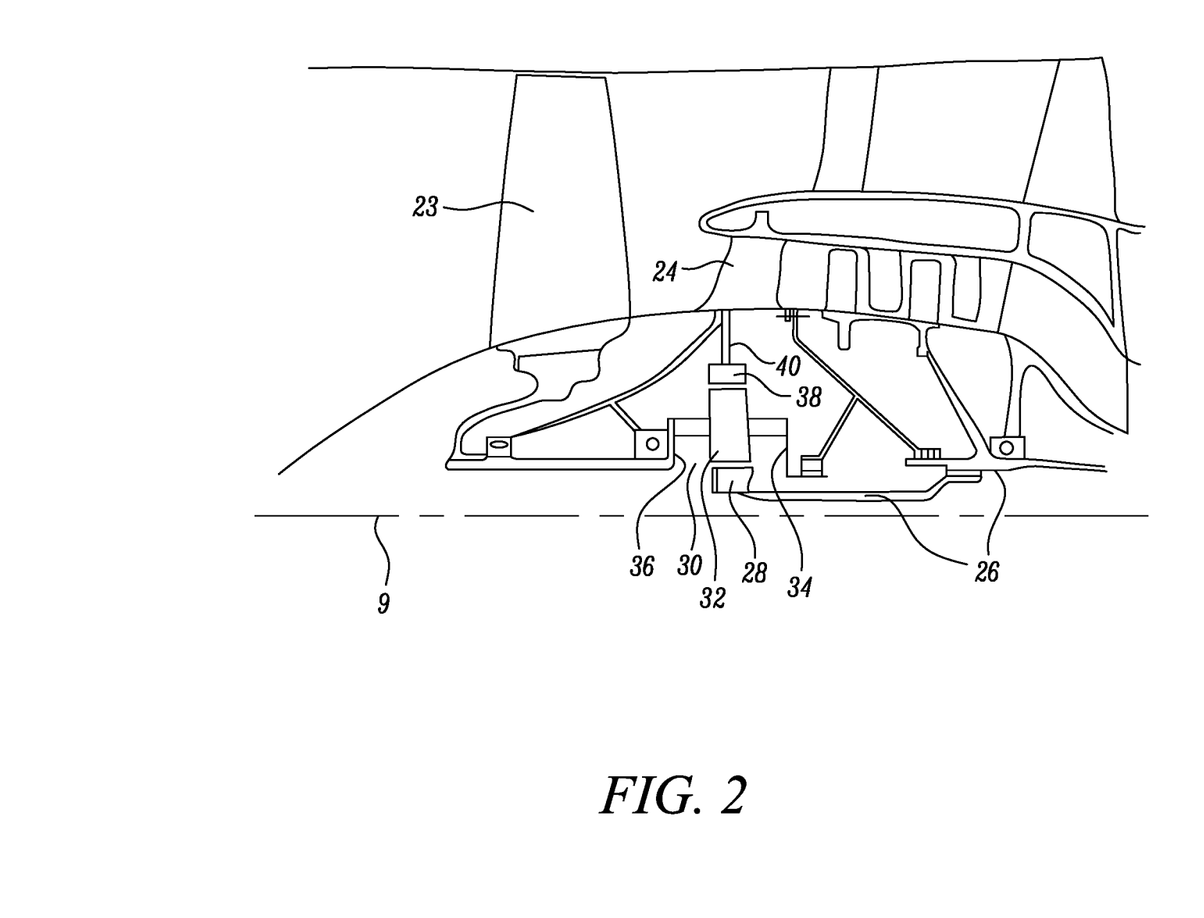
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear, 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to process around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
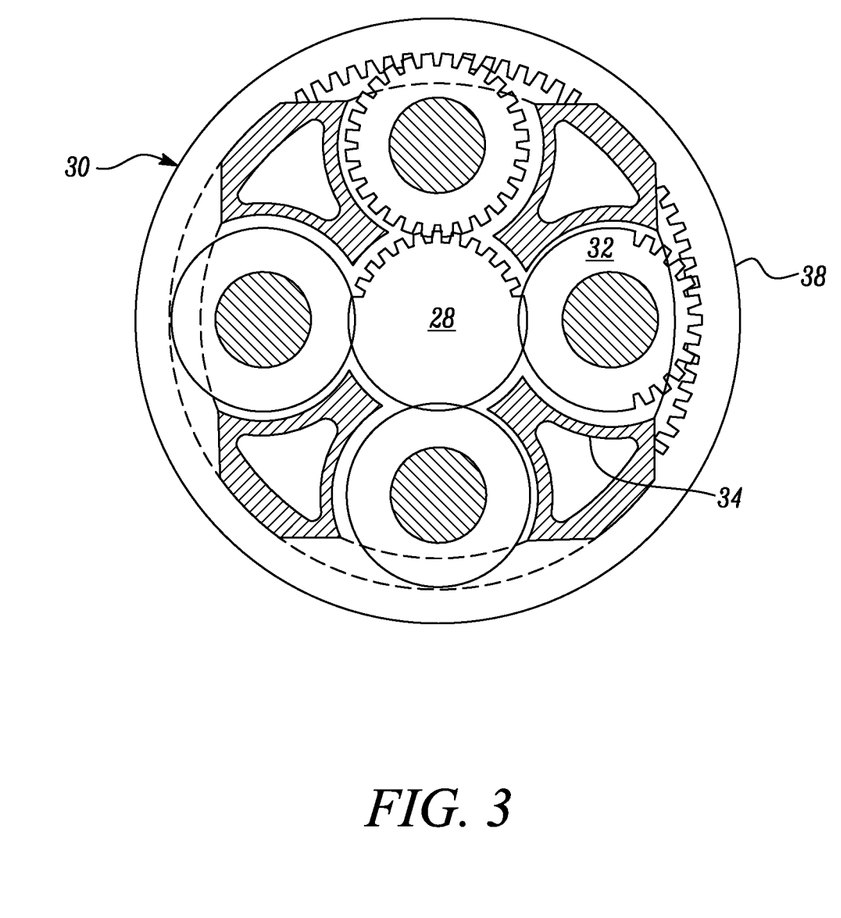
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIGS. 2 and 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIGS. 2 and 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 18, 20 meaning that the flow through the bypass duct 22 has its own nozzle 18 that is separate to and radially outside the core exhaust nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example. In some arrangements, the gas turbine engine 10 may not comprise a gearbox 30. In some other arrangements, the gas turbine engine 10 may comprise a direct drive.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the Figure view). The axial, radial and circumferential directions are mutually perpendicular.

In addition, the present invention is equally applicable to aero gas turbine engines, marine gas turbine engines and land-based gas turbine engines.

Figure 4:
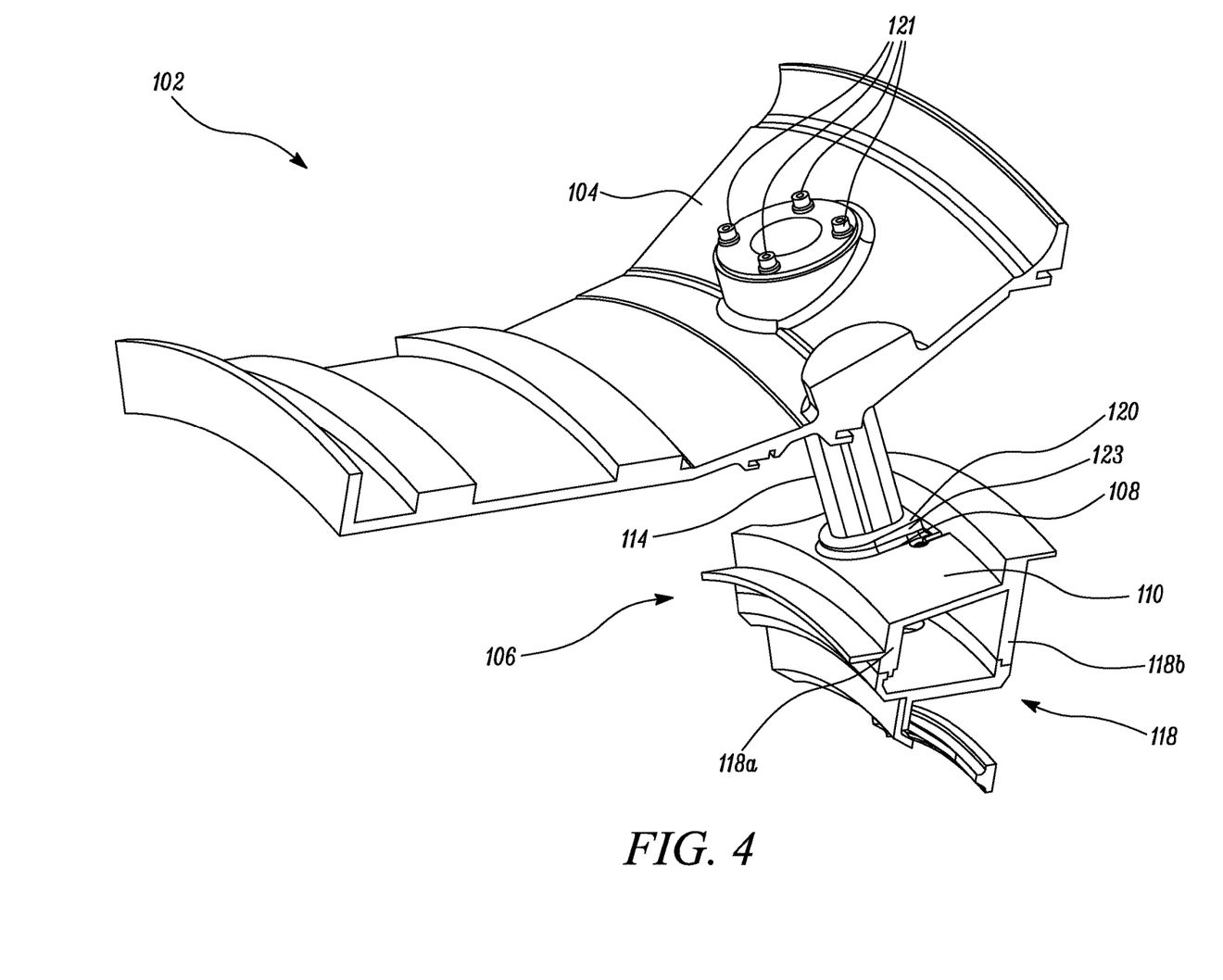
FIG. 4 is a perspective view of a support assembly for a gas turbine engine.

FIG. 4 illustrates a perspective view of a support assembly 102 for the gas turbine engine 10 (shown in FIG. 1) according to an embodiment of the present disclosure. Referring to FIGS. 1 and 4, the support assembly 102 is secured within the engine core 11. The support assembly 102 includes an outer casing 104, an inner structure 106, a strut 114 and a mechanical fastener 116 (shown in FIG. 5). The outer casing 104 defines a longitudinal central axis (not shown). Specifically, the longitudinal central axis of the outer casing 104 coincides with the principal engine rotational axis 9 of the gas turbine engine 10 (shown in FIGS. 1-2).

The inner structure 106 includes a platform 108 and a support portion 110. The support portion 110 is disposed around the platform 108. The strut 114 extends from the inner structure 106 to the outer casing 104. Specifically, the strut 114 extends generally radially from the inner structure 106 to the outer casing 104 with respect to the longitudinal central axis. In some embodiments, the strut 114 may also tilt axially and/or circumferentially with respect to the longitudinal central axis. The strut 114 is coupled to the outer casing 104. In an example, the strut 114 may be connected to the outer casing 104 by fasteners. In the illustrated embodiment, the strut 114 is rigidly connected to the outer casing 104 by fasteners 121. The platform 108 includes a support surface 120 that contacts the strut 114. The support surface 120 is raised with respect to the support portion 110. The support surface 120 is raised by a raised portion 123. Specifically, the support surface 120 is raised towards the outer casing 104. The inner structure further includes a torsion box 118, which has a front wall 118a and a rear wall 118b. Each of the front wall 118a and the rear wall 118b of the torsion box 118 is connected to the support portion 110 of the inner structure 106.

Figure 5:
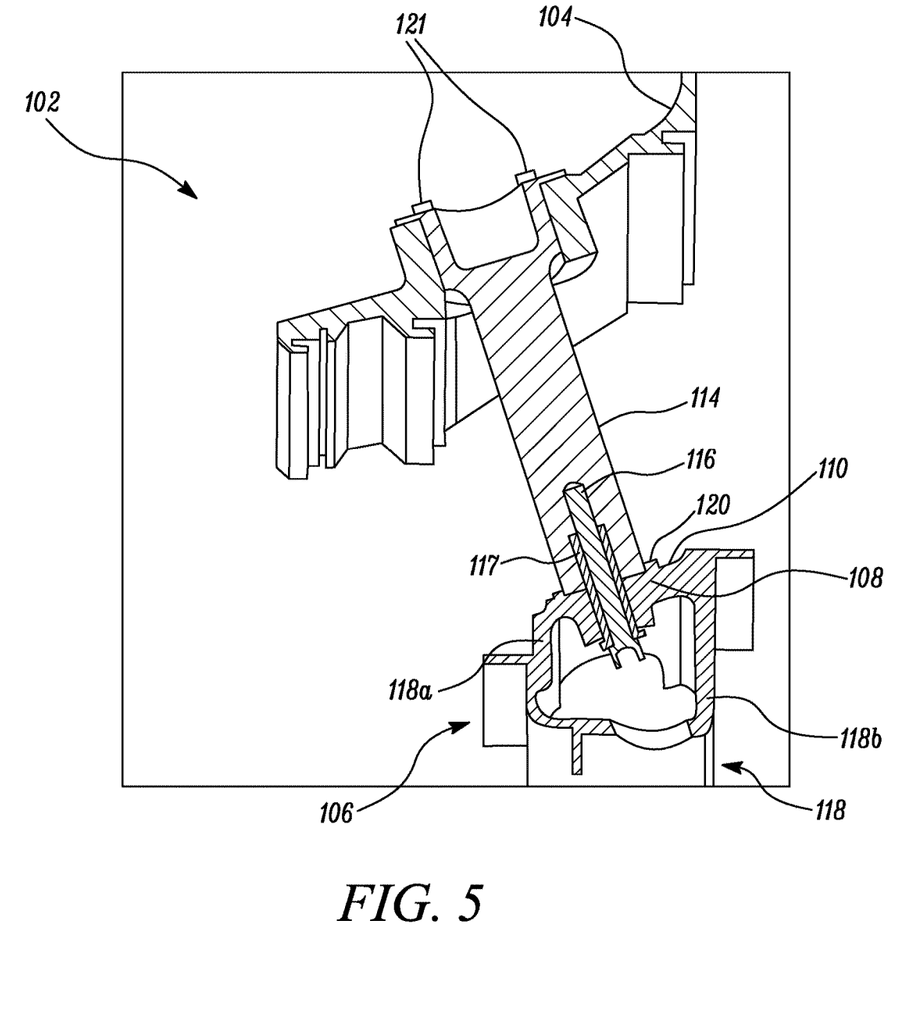
FIG. 5 is a sectional side view of the support assembly of FIG. 4.

FIG. 5 illustrates a sectional view of the support assembly 102. As shown in FIG. 5, the support assembly 102 includes the mechanical fastener 116 which is at least partially received within the strut 114. Specifically, the mechanical fastener 116 is at least partially received within the strut 114 to couple the strut 114 to the platform 108 of the inner structure 106. Furthermore, the platform 108 defines an aperture 112 (shown in FIG. 8) therethrough. The mechanical fastener 116 is received through the aperture 112 of the platform 108. In some embodiments, the mechanical fastener 116 may be a bolt, a screw, or a pin. In some other embodiments, the mechanical fastener 116 may be a rivet.

In the illustrated embodiment of FIG. 5, the strut 114 is slotted into the platform 108. The support surface 120 is raised with respect to the support portion 110 to allow the slotted connection between the strut 114 and the platform 108. However, in some other embodiments, the strut 114 may also be coupled to the platform 108 such that the strut 114 rests on the support surface 120 of the platform 108 without any slotted connection, i.e., the support surface 120 is not raised relative to the support portion 110.

The support assembly 102 further includes a sleeve 117 disposed between the mechanical fastener 116 and the platform 108. Specifically, the sleeve 117 is at least partially disposed between the mechanical fastener 116 and the platform 108. In some embodiments, the sleeve 117 may be a spacer or a wear component.

Figure 6:
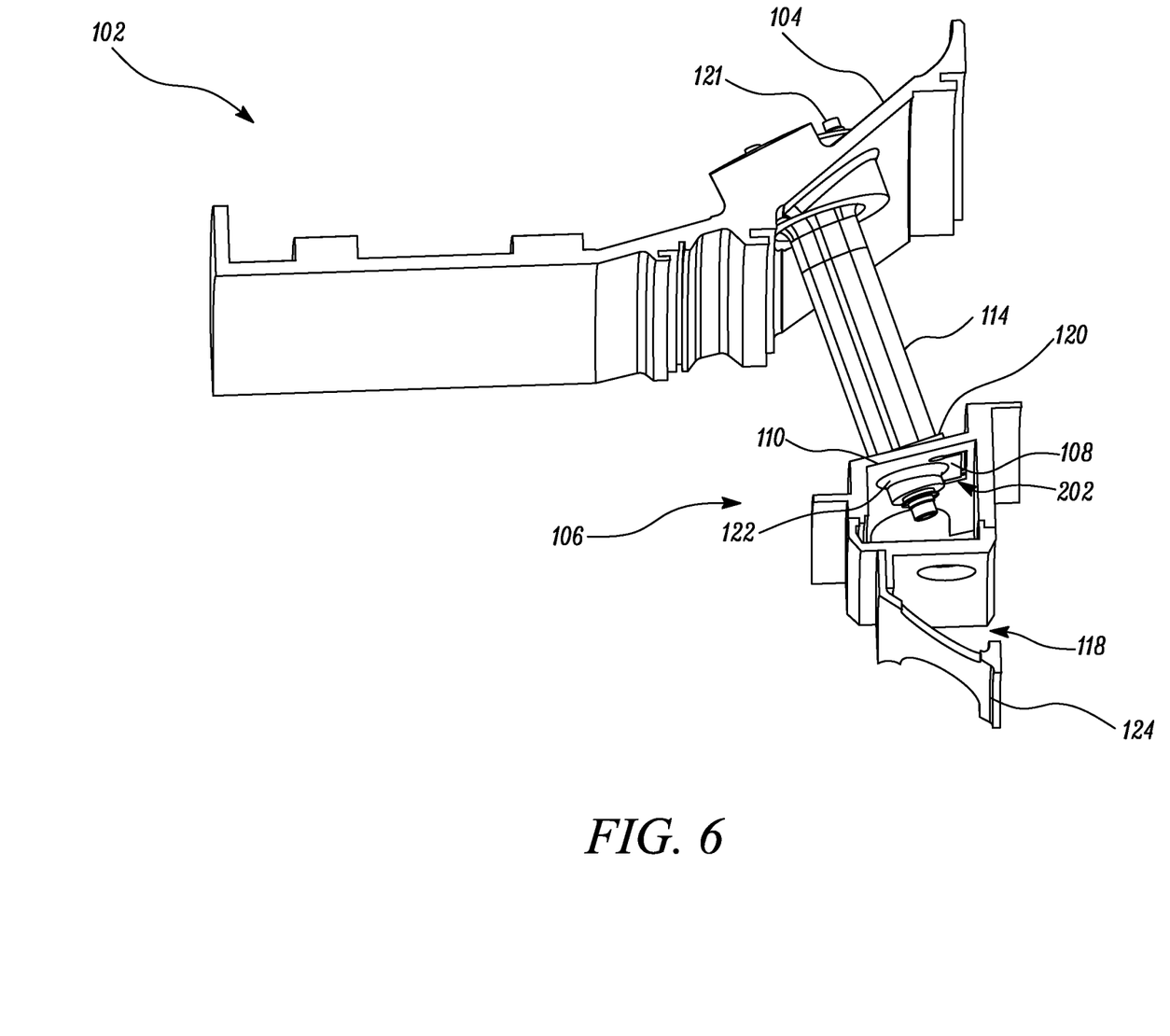
FIG. 6 is another perspective view of the support assembly of FIG. 4.

FIG. 6 illustrates another perspective side view of the support assembly 102. As shown, the platform 108 further includes a protrusion 122 at an end distal to the strut 114. The protrusion 122 extends radially inwards relative to the support portion 110. The protrusion 122 surrounds a portion of the mechanical fastener 116 that is distal to the strut 114. Furthermore, as shown in FIG. 6, the torsion box 118 is coupled to a bearing support component 124. The bearing support component 124 is further connected to the parts like shafts, bearings, etc. (not shown).

Figure 7:
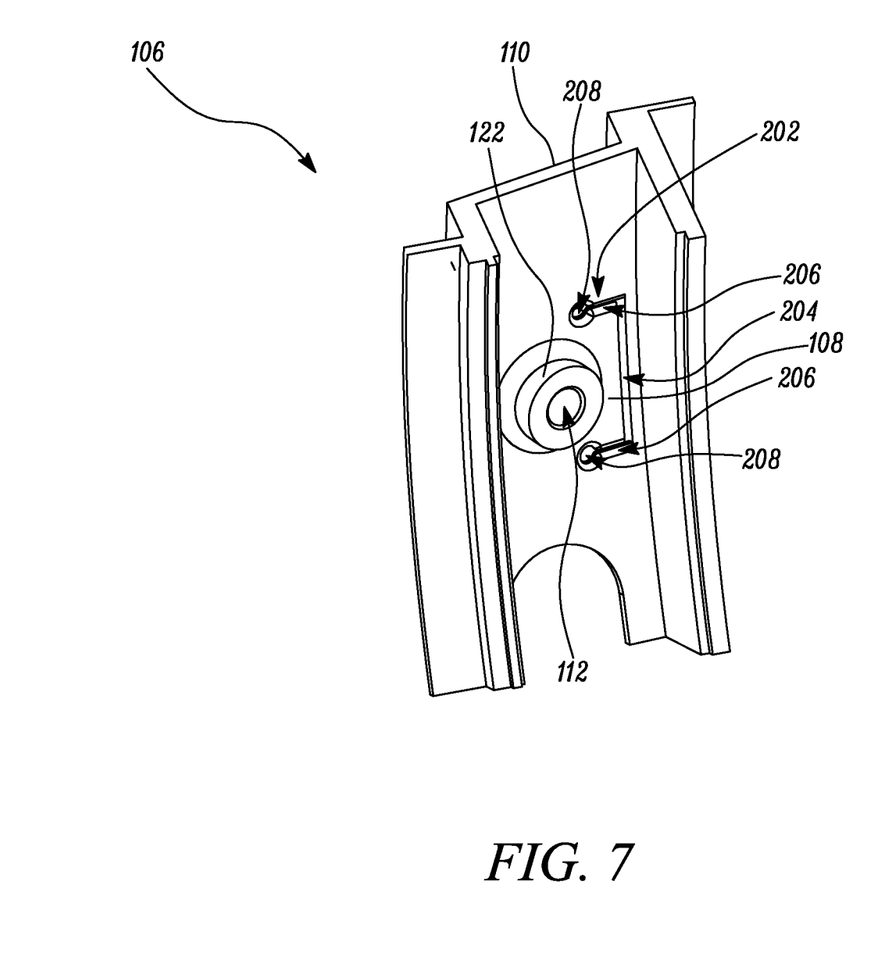
FIG. 7 is a bottom perspective view of an inner structure of the support assembly.

FIG. 7 shows a bottom close up perspective view of the inner structure 106. As shown in FIG. 7, the inner structure 106 defines a slot 202 therethrough. Specifically, the support portion 110 disposed around the platform 108 defines the slot 202 therethrough. The slot 202 is positioned and defined adjacent to the platform 108. In the illustrated embodiment of FIG. 7, the slot 202 at least partially surrounds the platform 108. The slot 202 includes a base 204 extending circumferentially relative to the longitudinal central axis (aligned with the rotational axis 9 shown in FIG. 1). The slot 202 further includes a pair of arms 206 extending axially from the base 204 towards the aperture 112 in the platform 108.

In some embodiments, the slot 202 may be formed by removing material from the support portion 110. In some other embodiments, the slot 202 may be formed in the support portion 110 by casting.

In some embodiments, the base 204 of the slot 202 is substantially straight. Each arm 206 of the slot 202 is at least partially straight. As shown in FIG. 7, each arm 206 of the slot 202 includes a circular portion 208. The circular portion 208 in each arm 206 is provided at an end distal to the base 204 of the slot 202. Each arm 206 with the circular portion 208 may be shaped like a keyhole.

Due to inclusion of the slot 202 in the inner structure 106, the platform 108 flexes relative to the support portion 110 at the slot 202. The flexing of the platform 108 relative to the support portion 110 results in the formation of a flexible joint between the radial strut 114 and the inner structure 106.

Figure 8:
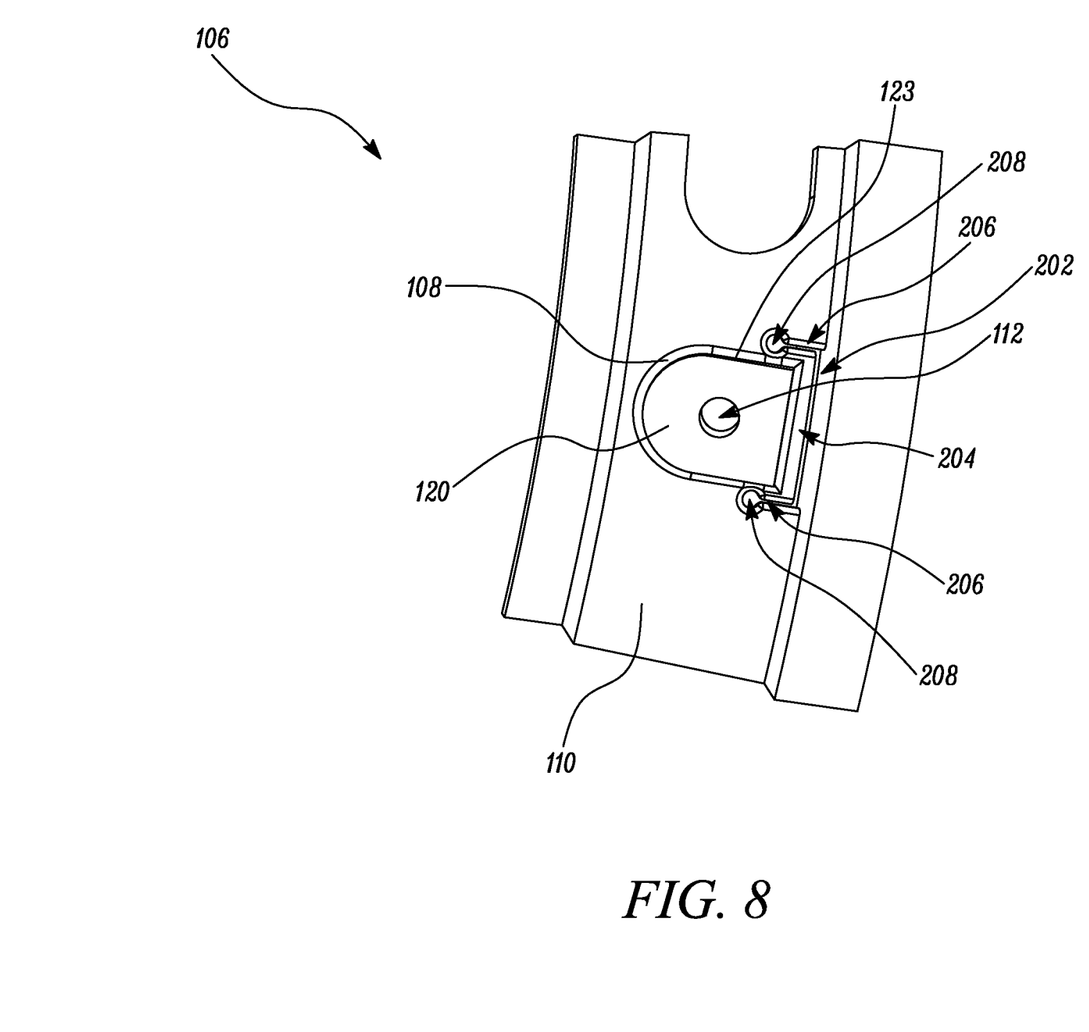
FIG. 8 is a top perspective view of the inner structure of FIG. 7.

FIG. 8 illustrates a close up top perspective view of the inner structure 106. As shown in FIG. 8, the platform 108 includes the support surface 120 which is raised with respect to the support portion 110 by the raised portion 123. Further, the slot 202 in the support portion 110 includes the base 204 and the arms 206. The circular portions 208 of the arms 206 are also shown in FIG. 8. The platform 108 further defines the aperture 112 therethrough.

Figure 9:
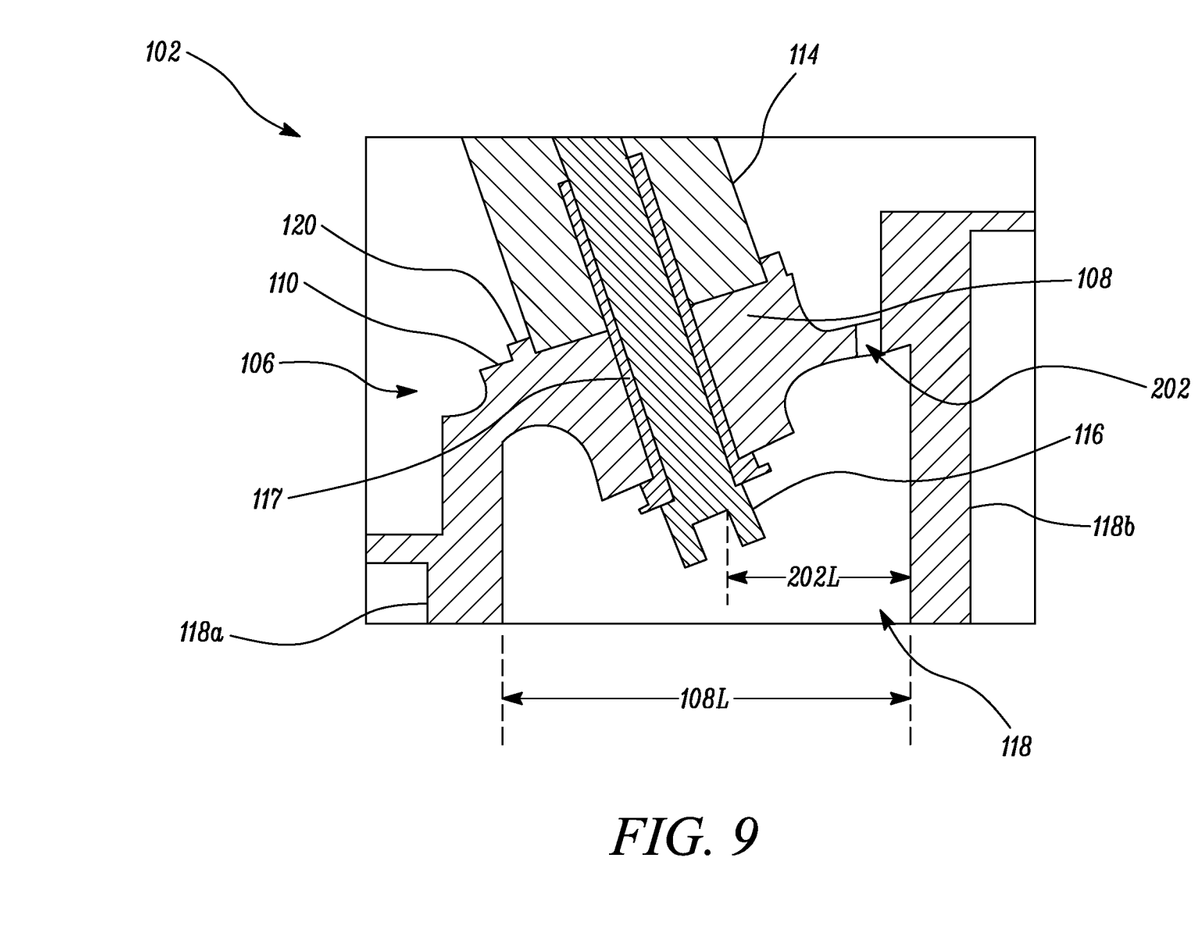
FIG. 9 is a sectional side view of the support assembly for a gas turbine engine.

FIG. 9 illustrates a side sectional view of the support assembly 102 according to an embodiment of the present disclosure. A mechanical joint between the inner structure 106 and the strut 114 is shown in FIG. 9. The mechanical fastener 116 couples the inner structure 106 to the strut 114.

Figure 10:
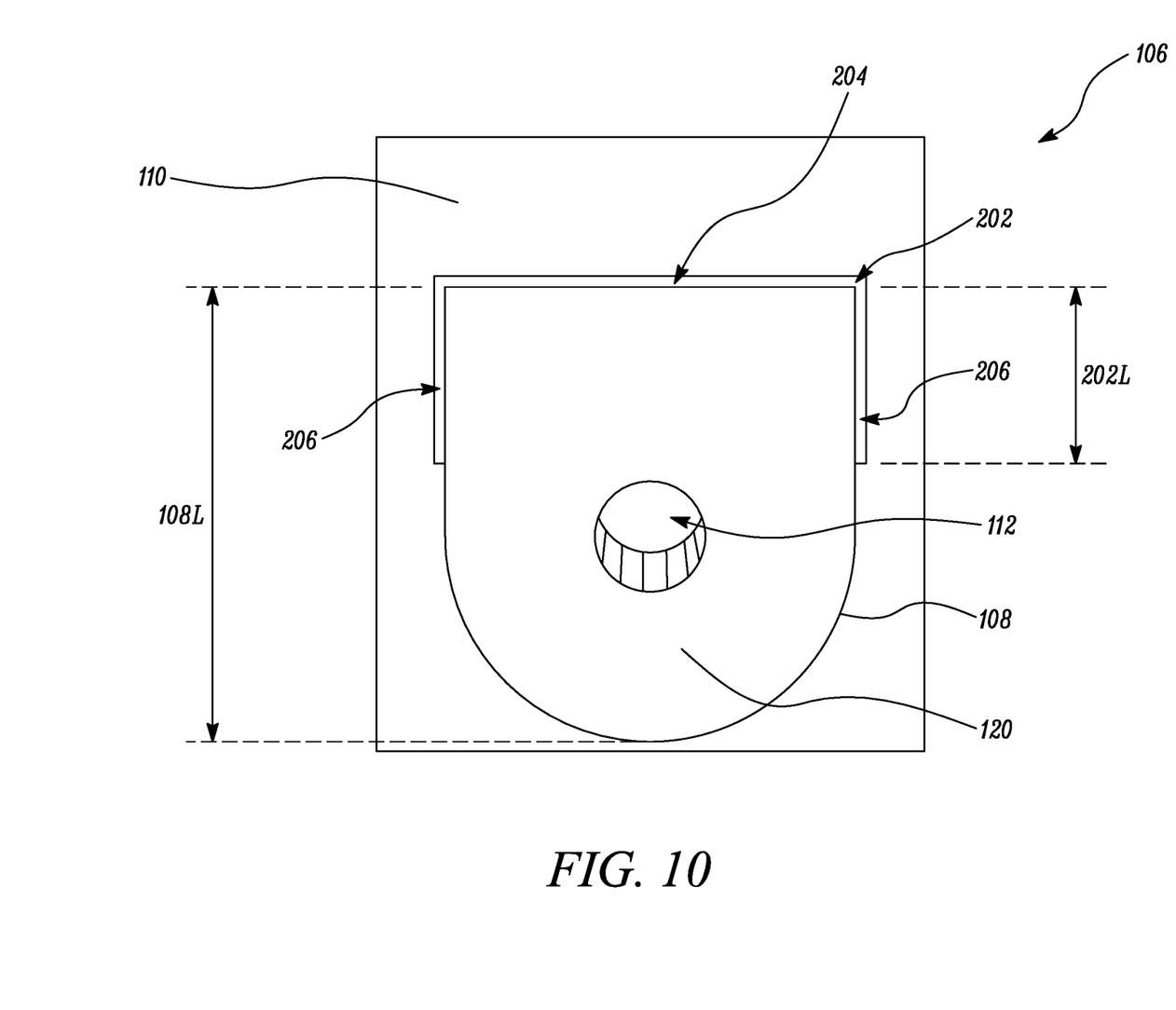
FIG. 10 is a top view of the inner structure of the support assembly of FIG. 9.

FIG. 10 illustrates a close-up top view of the inner structure 106 of the support assembly 102. Referring to FIGS. 9 and 10, the slot 202 in the support portion 110 extends axially towards the aperture 112. Specifically, the slot 202 extends axially by an axial slot length 202L along the longitudinal central axis (aligned with the rotational axis 9 shown in FIG. 1).

With continued reference to FIGS. 9 and 10 The slot 202 includes the base 204 and the pair of arms 206 similar to the embodiment described above with reference to FIGS. 7 and 8. However, in the illustrated embodiment of FIG. 10, each arm 206 of the slot 202 does not include any circular portion 208 and is substantially straight. Each arm 206 of the slot 202 has the axial length 202L along the longitudinal central axis (aligned with the rotational axis 9 shown in FIG. 1). Furthermore, the platform 108 has an axial platform length 108L extending along the longitudinal central axis.

The joint between the strut 114 and the inner structure 106 may be a contact joint. In conventional support structures, the contact joint is stiff, and thereby leads to joint opening. Therefore, a value of contact joint opening may have to be minimized for the support assembly 102.

Figure 11:
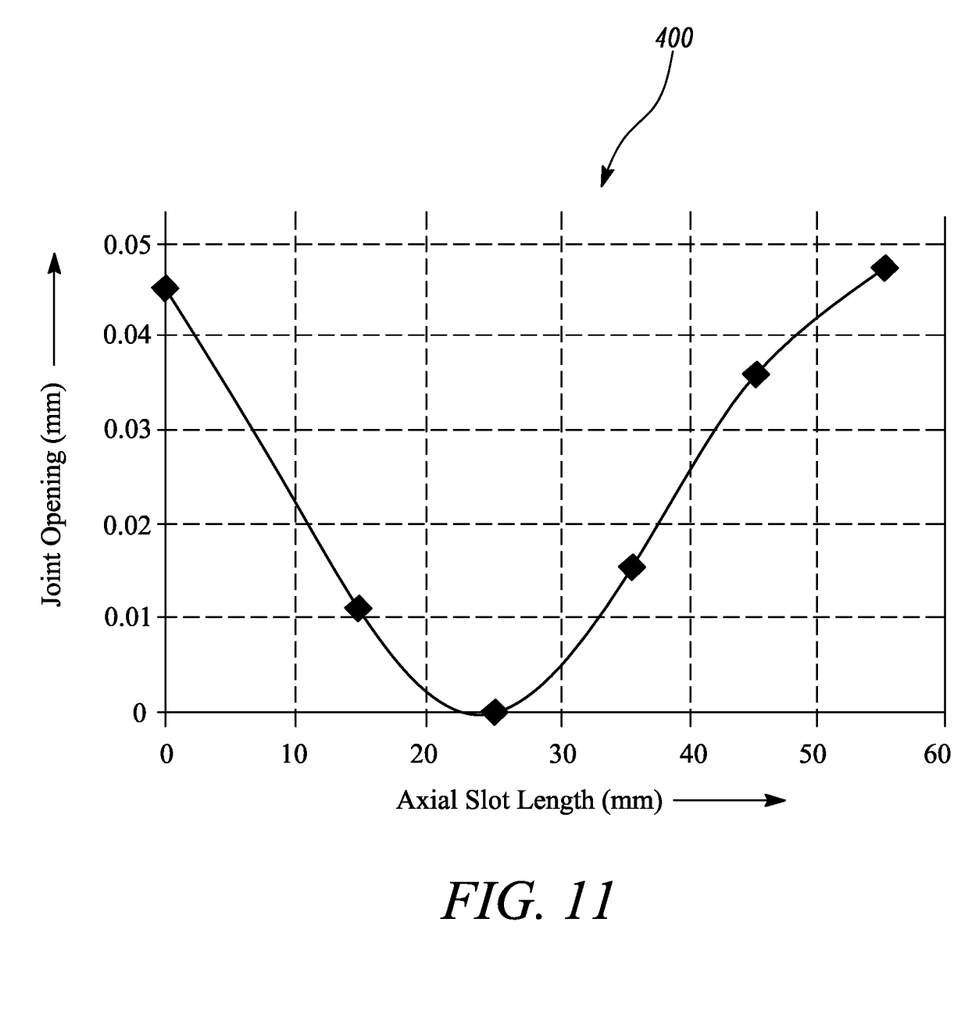
FIG. 11 is a graph illustrating a relationship between an axial slot length and a joint opening in the inner structure for a gas turbine engine.

FIG. 11 illustrates a graph 400 between the axial slot length 202L and the joint opening value (in mm). The axial slot length 202L may vary from a value of zero to a value equal to the axial platform length 108L. In some embodiments, the axial platform length 108L is about 60 mm. The axial slot length 202L is about 25 mm. In some embodiments, a ratio of the axial slot length 202L to the axial platform length 108L is from about 1:6 to about 2:3. In some other embodiments, the ratio of the axial slot length 202L to the axial platform length 108L is about 5:12. Furthermore, the joint opening is minimum (substantially zero) when the axial slot length 202L is around 25 mm.

According to an embodiment, the gas turbine engine 10 including the support assembly 102 described with respect to FIGS. 6-10 may be used in an aircraft (not shown). The aircraft may include a bearing (not shown) and the support assembly 102 described herein. In an example, the support assembly 102 may be a turbine bearing structure in the aircraft. The support assembly 102 or the turbine bearing structure is usually positioned between the low pressure turbine 19 and the high pressure turbine 17 (shown in FIG. 1)

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

The invention claimed is:

1. A support assembly for a gas turbine engine, the support assembly comprising:
   an outer casing defining a longitudinal central axis;
   an inner structure comprising a platform defining an aperture therethrough and a support portion disposed around the platform and defining a slot therethrough adjacent to the platform, wherein the slot at least partially surrounds the platform and extends axially towards the aperture by an axial slot length along the longitudinal central axis;
   a strut extending generally radially from the inner structure to the outer casing with respect to the longitudinal central axis, wherein the strut is coupled to the outer casing; and
   a mechanical fastener received through the aperture of the platform and at least partially received within the strut to couple the strut to the platform,
      wherein the platform flexes relative to the support portion at the slot to form a flexible joint between the strut and the inner structure.

2. The support assembly of claim 1, wherein the slot comprises a base extending circumferentially relative to the longitudinal central axis and a pair of arms extending axially from the base towards the aperture, wherein each arm has the axial slot length along the longitudinal central axis.

3. The support assembly of claim 2, wherein the base of the slot is substantially straight.

4. The support assembly of claim 2, wherein each arm includes at least one straight portion is.

5. The support assembly of claim 4, wherein each arm further comprises a circular portion at an end distal to the base.

6. The support assembly of claim 1, wherein the platform (108) has an axial platform length along the longitudinal central axis, wherein a ratio of the axial slot length to the axial platform length is from about 1:6 to about 2:3.

7. The support assembly of claim 6, wherein the ratio of the axial slot length to the axial platform length is about 5:12.

8. The support assembly of claim 7, wherein the axial slot length is about 25 mm.

9. The support assembly of claim 8, wherein the axial platform length is about 60 mm.

10. The support assembly of claim 1, wherein the platform comprises a support surface that contacts the strut, and wherein the support surface is raised with respect to the support portion.

11. The support assembly of claim 1, wherein the platform further comprises a protrusion that extends radially inward relative to the support portion.

12. The support assembly of claim 1, further comprising a sleeve disposed between the mechanical fastener and the platform.

13. The support assembly of claim 12, wherein the sleeve is at least partly disposed between the mechanical fastener and the platform.

14. The support assembly of claim 1, wherein the inner structure further comprises a torsion box.

15. A gas turbine engine for an aircraft, the gas turbine comprising:
   a bearing; and
   the support assembly of claim 1, wherein the inner structure is coupled to the bearing.

* * * * *